(No Model.)
W. H. ROTHERMEL.
NUT LOCK.
No. 304,280. Patented Aug. 26, 1884.
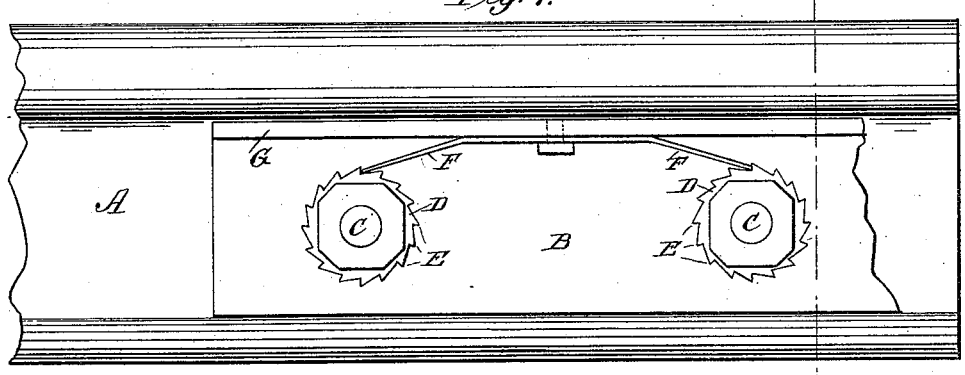
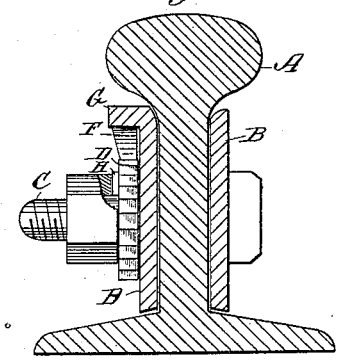
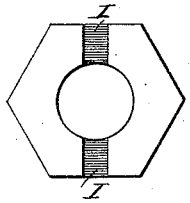
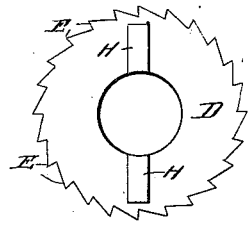
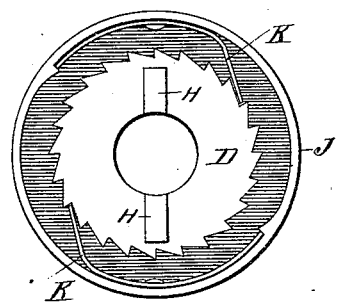
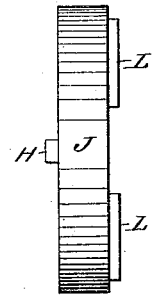
WITNESSES:
U. W. Hollingsworth
A. G. Lyne.
INVENTOR:
Wm. H. Rothermel
BY Munn & Co.
ATTORNEYS.

UNITED STATES PATENT OFFICE.

WILLIAM H. ROTHERMEL, OF BLANDON, PENNSYLVANIA.

NUT-LOCK.

SPECIFICATION forming part of Letters Patent No. 304,280, dated August 26, 1884.

Application filed May 9, 1884. (No model.)

*To all whom it may concern:*

Be it known that I, WILLIAM H. ROTHERMEL, of Blandon, in the county of Berks and State of Pennsylvania, have invented a new and useful Improvement in Nut-Locks, of which the following is a full, clear, and exact description, reference being had to the annexed drawings, forming part of this specification.

This invention relates to washer nut-locks; and it consists of the combination of parts hereinafter described and claimed.

In the drawings, Figure 1 is a side elevation of part of a railway-rail, showing my invention. Fig. 2 is a cross-section of the same partly broken away. Figs. 3 and 4 are detail views of the nut and washer, respectively; and Figs. 5 and 6 are detail views of the washer, showing a modification.

A indicates part of a railway-rail; B, the fish-plate, and C the bolts connecting the fish-plate with the rail. Each bolt is provided with a washer, D, having ratchet-teeth E formed in its periphery in the manner of a ratchet-wheel. Where the bolts are arranged in pairs, as in the drawings, one of the bolts is to have a right-hand thread and the other a left-hand thread, and the teeth of the washers are to be right and left hand to correspond, in order that a pair of spring-pawls, F, formed of a single piece of metal, may be used for preventing the backward movement of the washers. This strip of metal forming the pawls F is secured at its center, midway between but above the washers D, to a flange, G, of the fish-plate B, and its ends are bent downward to engage the teeth of the washers. The faces of the washers D are provided with lugs H, which correspond to recesses I in the backs of the nuts, the same being so constructed that when the nuts are placed in contact with the washers each nut will interlock with a washer and be adapted to move together therewith as one piece. In screwing up the nut the pawl allows the washer to turn with the nut, and when the nut is screwed up it is held from unscrewing by the washer, which itself is held by the pawl. When it is desired to unscrew the nut, the pawl may be lifted and held out of contact with the washer.

Instead of the spring-pawls, pivoted gravity-pawls of ordinary construction and arrangement may be used.

In adapting my invention for general use I provide an additional washer, J, consisting of a cylindrical shell, in which are secured two oppositely-arranged spring-pawls K, and arrange the ratcheted washer D inside the shell in engagement with the pawls. The back of the washer J is provided with lugs L, which are to be fitted in corresponding recesses in the part against which it is to rest, to prevent it from turning. The washer D in this form of the invention is formed as above described, and the nut is to engage therewith by means of the lugs H and recesses I. In this form of the invention, as in the first described, the flat spring-pawl is supported by a part that projects out over the ratchet-teeth, so that the spring is securely held from lateral displacement.

What I claim is—

1. The combination, with a washer having ratchet-teeth in its periphery and means for engaging a nut, of a flat spring-pawl and a rigid support for the pawl, which support projects out over the ratchet-teeth to support the pawl in proper position, substantially as shown and described.

2. The combination, with the two washers having right and left hand ratchet-teeth, respectively, and lugs for engaging nuts, of the spring-pawls and the fish-plate having the outwardly-projecting flange G for supporting said pawls, substantially as shown and described.

WM. H. ROTHERMEL.

Witnesses:
A. G. LYNE,
M. S. EBY.